(12) United States Patent
Arimilli et al.

(10) Patent No.: US 7,925,842 B2
(45) Date of Patent: Apr. 12, 2011

(54) ALLOCATING A GLOBAL SHARED MEMORY

(75) Inventors: Ravi K. Arimilli, Austin, TX (US); Robert S. Blackmore, Poughkeepsie, NY (US); Ramakrishnan Rajamony, Austin, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 11/958,956

(22) Filed: Dec. 18, 2007

(65) Prior Publication Data

US 2009/0157996 A1 Jun. 18, 2009

(51) Int. Cl.
*G06F 12/00* (2006.01)
*G06F 13/00* (2006.01)
*G06F 13/28* (2006.01)
(52) U.S. Cl. ................................ 711/147; 711/E12.039
(58) Field of Classification Search .......................... None
See application file for complete search history.

(56) References Cited

U.S. PATENT DOCUMENTS

| 4,204,113 | A | 5/1980 | Giraud et al. |
| 5,016,169 | A | 5/1991 | Koya et al. |
| 5,918,229 | A | 6/1999 | Davis et al. |
| 6,668,299 | B1 | 12/2003 | Kagan et al. |
| 6,952,722 | B1 | 10/2005 | Podila et al. |
| 7,213,081 | B2 | 5/2007 | Narasimhamurthy et al. |
| 7,447,867 | B2 | 11/2008 | Soja et al. |
| 7,533,238 | B2 | 5/2009 | Burns et al. |
| 2002/0032844 | A1* | 3/2002 | West .............................. 711/171 |
| 2004/0098447 | A1 | 5/2004 | Verbeke et al. |
| 2004/0107419 | A1* | 6/2004 | Blackmore et al. ............ 718/100 |
| 2005/0149903 | A1 | 7/2005 | Archambault et al. |
| 2007/0033592 | A1 | 2/2007 | Roediger et al. |
| 2009/0198837 | A1 | 8/2009 | Arimilli et al. |
| 2009/0198971 | A1 | 8/2009 | Arimilli et al. |

FOREIGN PATENT DOCUMENTS

WO 98/32077 7/1998

OTHER PUBLICATIONS

Peyton, T., Office Action dated Mar. 10, 2010: U.S. Appl. No. 12/024,695.

* cited by examiner

*Primary Examiner* — Matt Kim
*Assistant Examiner* — Ralph A Verderamo, III
(74) *Attorney, Agent, or Firm* — Dillon & Yudell LLP (57) ABSTRACT

A method of operating a data processing system includes each of multiple tasks within a parallel job executing on multiple nodes of the data processing system issuing a system call to request allocation of backing storage in physical memory for global shared memory accessible to all of the multiple tasks within the parallel job, where the global shared memory is in a global address space defined by a range of effective addresses. Each task among the multiple tasks receives an indication that the allocation requested by the system call was successful only if the global address space for that task was previously reserved and backing storage for the global shared memory has not already been allocated.

16 Claims, 7 Drawing Sheets

ALLOCATING A GLOBAL SHARED MEMORY

This invention was made with Government support under DARPA, HR0011-07-9-0002. THE GOVERNMENT HAS CERTAIN RIGHTS IN THIS INVENTION.

BACKGROUND OF THE INVENTION

1. Technical Field

The present invention relates in general to data processing and, in particular, to memory management in a data processing system having a global address space.

2. Description of the Related Art

It is well-known in the computer arts that greater computer system performance can be achieved by harnessing the processing power of multiple individual processing units. Multiprocessor (MP) computer systems can be designed with a number of different topologies, of which various ones may be better suited for particular applications depending upon the performance requirements and software environment of each application. One common MP computer architecture is a symmetric multi-processor (SMP) architecture in which multiple processing units, each supported by a multi-level cache hierarchy, share a common pool of resources, such as a system memory and input/output (I/O) subsystem, which are often coupled to a shared system interconnect. Such computer systems are said to be symmetric because all processing units in an SMP computer system ideally have equal access latencies to the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processing units), inherent interconnect, memory, and input/output (I/O) bandwidth limitations prevent significant advantage from being obtained by scaling a SMP beyond a implementation-dependent size at which the utilization of the shared resources is optimized. Thus, many SMP architectures suffer to a certain extent from bandwidth limitations, especially at the system memory, as the system scale increases.

An alternative MP computer system topology known as non-uniform memory access (NUMA) has also been employed to addresses limitations to the scalability and expandability of SMP computer systems. A conventional NUMA computer system includes a switch or other global interconnect to which multiple nodes, which can each be implemented as a small-scale SMP system, are connected. Processing units in the nodes enjoy relatively low latency access latencies for data contained in the local system memory their nodes, but suffer significantly higher access latencies for data contained in the system memories in remote nodes. Thus, access latencies to system memory are non-uniform. Because each node has its own resources, NUMA systems have potentially higher scalability than SMP systems.

Regardless of whether an SMP, NUMA or other MP data processing system architecture is employed, it is typical that each processing unit accesses data residing in memory-mapped storage locations (whether in physical system memory, cache memory or another system resource) by utilizing real addresses to identifying the storage locations of interest. An important characteristic of real addresses is that there is a unique real address for each memory-mapped physical storage location.

Because the one-to-one correspondence between memory-mapped physical storage locations and real addresses necessarily limits the number of storage locations that can be referenced by software, the processing units of most commercial MP data processing systems employ memory virtualization to enlarge the number of addressable locations. In fact, the size of the virtual memory address space can be orders of magnitude greater than the size of the real address space. Thus, in a conventional systems, processing units internally reference memory locations by the virtual (or effective) addresses and then perform virtual-to-real address translations (often via one or more intermediate logical address spaces) to access the physical memory locations identified by the real addresses.

Subject to synchronizing primitives and software-controlled virtual memory attributes, each of the processing units in a typical MP system can generally independently read, modify, and store data corresponding to any memory-mapped storage location within the system. Consequently, in order to ensure correctness, coherency protocols are typically employed to provide all processing units in the MP system a common view of the contents of memory. As is well known in the art, coherency protocols, whether fully distributed or directory-based, employ a predetermined set of cache states in all the cache memories of the MP system, as well as specified messaging between the various controllers of the cache memories and system memories in the MP system in order to maintain coherency. While the implementation of a coherency protocol permits all processing units in an MP system to concurrently process a common data set defined by a range of real addresses, the coherency communication required by the coherency protocol can limit the scalability of the MP system by consuming bandwidth on the system interconnects.

SUMMARY OF THE INVENTION

The present invention can be expressed in multiple different embodiments. In at least one embodiment, a method of operating a data processing system includes each of multiple tasks within a parallel job executing on multiple nodes of the data processing system issuing a system call to request allocation of backing storage in physical memory for global shared memory accessible to all of the multiple tasks within the parallel job, where the global shared memory is in a global address space defined by a range of effective addresses. Each task among the multiple tasks receives an indication that the allocation requested by the system call was successful only if the global address space for that task was previously reserved and backing storage for the global shared memory has not already been allocated.

BRIEF DESCRIPTION OF THE DRAWINGS

The present invention, as well as a preferred mode of use, will best be understood by reference to the following detailed description of an illustrative embodiment when read in conjunction with the accompanying drawings, wherein.

DETAILED DESCRIPTION OF ILLUSTRATIVE EMBODIMENT

Figure 1:
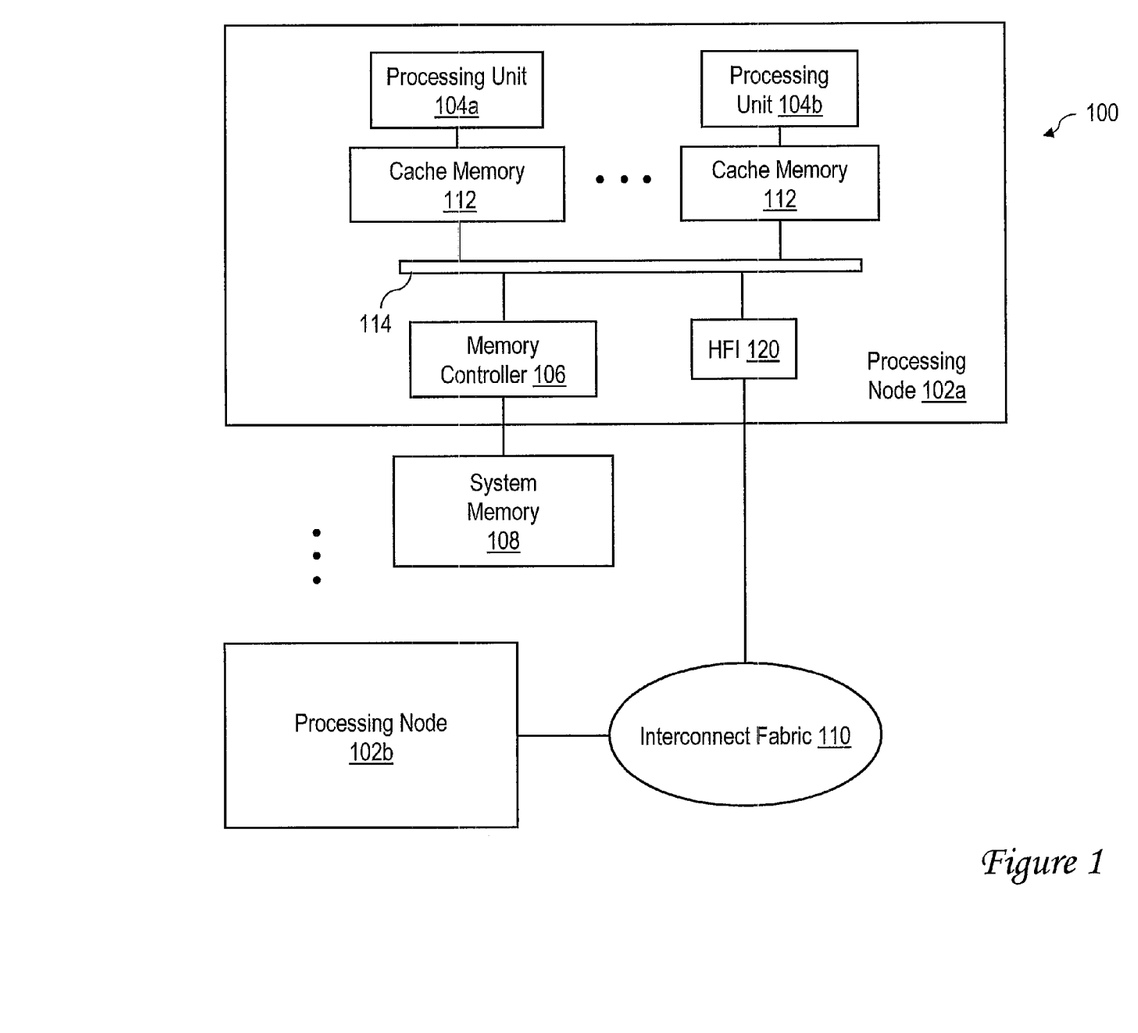
FIG. 1 is a high level block diagram of a data processing system in which the present invention may advantageously be employed.

With reference now to the figures, wherein like reference numerals refer to like and corresponding parts throughout, and in particular with reference to FIG. 1, there is illustrated a high-level block diagram depicting a first view of an exemplary data processing system 100 in which the present invention may be implemented. As shown, data processing system 100 includes multiple processing nodes 102a, 102b for processing data and instructions. Processing nodes 102 are coupled via a host fabric interface (HFI) to an interconnect fabric 110 that supports data communication between processing nodes 102 in accordance with one or more interconnect and/or network protocols. Interconnect fabric 110 may be implemented, for example, utilizing one or more buses, switches and/or networks.

As utilized herein, the term processing node (or simply node) is defined as the set of computing resources that form the domain of a coherent operating system (OS) image. For clarity, it should be understood that, depending on configuration, a single physical system may include multiple nodes. The number of processing nodes 102 deployed in a given system is implementation-dependent and can vary widely, for example, from a few nodes to many thousand nodes.

Each processing node 102 may be implemented, for example, as a single integrated circuit chip (e.g., system-on-a-chip (SOC)), multi-chip module (MCM), or circuit board, which contains one or more processing units 104 (e.g., processing units 104a, 104b) for processing instructions and data. Each processing unit 104 may concurrently execute one or more hardware threads of execution.

As shown, each processing unit 104 is supported by cache memory 112, which contains one or more levels of in-line or lookaside cache. As is known in the art, cache memories 112 provide processing units 104 with low latency access to instructions and data received from source(s) within the same processing node 104 and/or remote processing node(s) 104. The processing units 104 within each processing node 102 are coupled to a local interconnect 114, which may be implemented, for example, with one or more buses and/or switches. Local interconnect 114 is further coupled to HFI 120 to support data communication between processing nodes 102.

As further illustrated in FIG. 1, processing nodes 102 typically include at least one memory controller 106, which may be coupled to local interconnect 114 to provide an interface to a respective physical system memory 108. In alternative embodiments of the invention, one or more memory controllers 106 can be coupled to interconnect fabric 110 or directly to a processing unit 104 rather than a local interconnect 114.

Those skilled in the art will appreciate that processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein.

Figure 2:
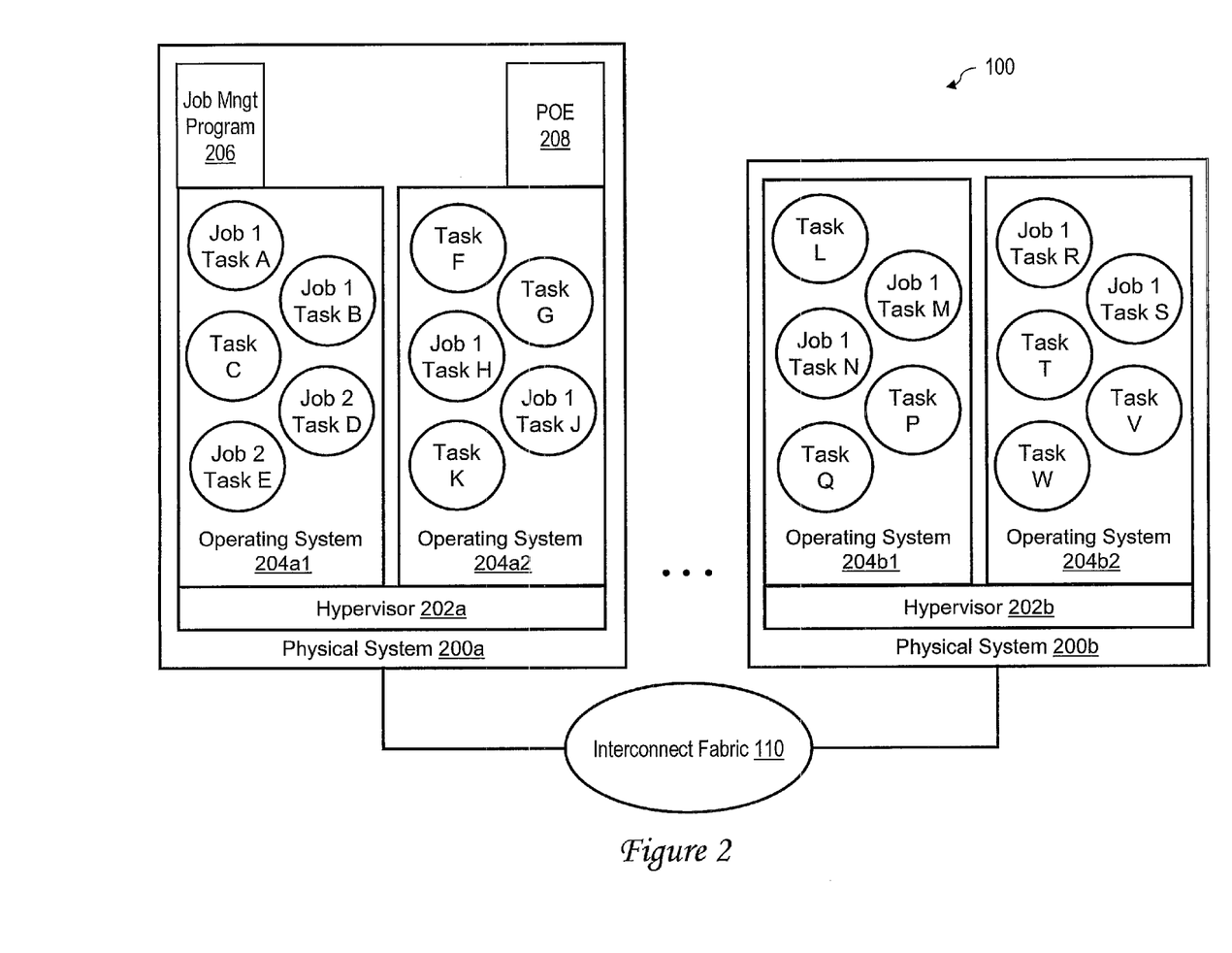
FIG. 2 is a high level block diagram of the software environment of the data processing system depicted in FIG. 1.

Referring now to FIG. 2, there is depicted a high level view of an exemplary software environment for data processing system 100 in accordance with the present invention. As depicted, in the exemplary embodiment data processing system 100 includes at least two physical systems 200a and 200b coupled by interconnect fabric 110. In the depicted embodiment, each physical system 200 includes at least two concurrent nodes. That is, physical system 200a includes a first node corresponding to operating system 204a1 and a second node corresponding to operating system 204a2. Similarly, physical system 200a includes a first node corresponding to operating system 204b1 and a second node corresponding to operating system 204b2. The operating systems 204 concurrently executing within each physical system 200 may be homogeneous or heterogeneous.

Each physical system 200 further includes an instance of a hypervisor 202 (also referred to as a Virtual Machine Monitor (VMM)). Hypervisor 202 is a program that manages the full virtualization or paravirtualization of the resources of physical system 200 and serves as an operating system supervisor. As such, hypervisor 202 governs the creation and destruction of nodes and the allocation of the resources of the physical system 200 between nodes.

In accordance with the present invention, the execution of parallel jobs in data processing system 100 is facilitated by the implementation of a new shared memory paradigm referred to herein as global shared memory (GSM), which enables multiple nodes executing tasks of a parallel job to access a shared effective address space, referred to herein as a global address space (GAS). In describing the present invention, the following terms will be employed as defined below:

Effective, virtual, and real address spaces: a user-level program uses effective addresses (EAs), which are translated into operating system (OS)-specific virtual addresses (VAs). The OS and the hardware memory management units (MMUs) translate VAs into real addresses (RAs) at the time of use.

Node: the set of computing resources that form the domain of a coherent operating system (OS) image.

Cluster: a collection of two or more nodes.

System: the collection of all nodes in the cluster domain.

Parallel Job: an application that executes on some or all the nodes in a cluster. A job is made up of tasks (processes), each of which executes in a node domain in the cluster. A parallel job has various attributes including a job ID that uniquely identifies the parallel tasks that comprise the parallel job in the entire system.

Task: a single process that executes within a single effective address (EA) space. By definition, a task executes wholly within a node. However, multiple tasks in a parallel job may execute on the same node (typically proportional to the number of CPUs on the node). A task can include one or more threads of control that all view and share the same effective address (EA) space.

Global shared memory (GSM)-enabled job: a parallel job, in which the component tasks have arranged to make parts of their individual effective address (EA) spaces accessible to each other via global shared memory (GSM) operations.

Global address space (GAS): the union of all effective addresses (EAs) in a GSM job that are accessible to more than one task via GSM operations.

Global address: an effective address within a task described as <T, EA> that is accessible to other tasks.

The <T, EA> tuple completely and uniquely identifies a GSM address. Consequently, a task need not store task-specific address information to access remote memory via a hardware access.

Home: the specific node where a particular location in the global address space (GAS) is physically allocated in physical memory. Every location in the GAS has exactly one home.

Thus, under the memory model employed by the present invention, data processing system 100 can execute multiple different types of tasks. First, data processing system 100 can execute conventional Tasks C, F, G, K, L, P, Q, T, V and W, which are independently executed under operating systems 204. Second, data processing system 100 can execute parallel jobs, such as Job 2, that are confined to a single node. That is, Tasks D and E are executed within the node corresponding to operating system 204a1 of physical system 200a and can share a common GAS. Third, data processing system 100 can execute parallel jobs, such as Job 1, that span multiple nodes and even multiple physical systems 200. For example, in the depicted operating scenario, Tasks A and B of Job 1 execute on operating system 204a1, Tasks H and J of Job 1 execute on operating system 204a2, Tasks M and N of Job 1 execute on operating system 204b1, and Tasks R and S of Job 1 execute on operating system 204b2. It should be noted that tasks of multiple different jobs (e.g., Job 1 and Job 2) are permitted to concurrent execute within a single node.

Additional applications can optionally be executed under operating systems 204 to facilitate the creation and execution of jobs. For example, FIG. 2 depicts a job management program 206, such as LoadLeveler, executing under operating system 204a1 and a runtime environment executing under operating system 204a2, such as Parallel Operating Environment (POE) 208. LoadLeveler and Parallel Operating Environment are both commercially available products available from IBM Corporation of Armonk, N.Y. LoadLeveler and POE can be utilized as a convenience to the user, but are not required. It is preferred, however, if some privileged program is available to both bootstrap non-privileged executables on the cluster nodes and to enable them to request and use node resources.

Figure 3:
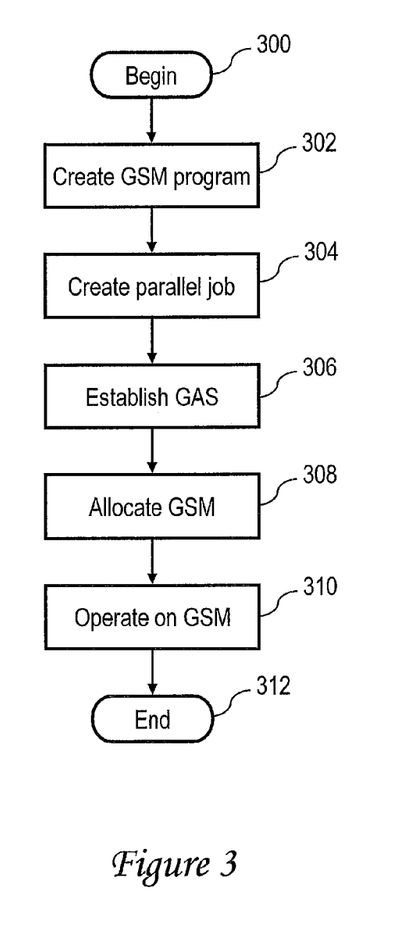
FIG. 3 is high level flowchart of an exemplary method of reserving, allocating and utilizing a global address space (GAS) in accordance with the present invention.

With reference now to FIG. 3, there is illustrated a high level logical flowchart of an exemplary method of reserving, allocating and utilizing a global address space (GAS) in accordance with the present invention. The illustrated method begins at block 300 and then proceeds to block 302, which illustrates the creation of a program that will utilize global shared memory. The program can be written, for example, in a Partitioned Global Address Space (PGAS) language such as Unified Parallel C (UPC) or X10. Alternatively, the program may employ another programming model, such as those using Cray "shmem" primitives, user-level Remote Direct Memory Access (RDMA), Global Arrays, and programs that combine a Message Passing Interface (MPI) with other programming model constructs. It will be appreciated that the source code of the GSM program can be created by a human user and/or can be generated in an automated fashion by other software. Following generation of the source code of the GSM program, the source code of the GSM program is compiled to obtain an executable GSM program.

Following creation of the program at block 302, the process proceeds to block 304. Block 304 depicts the creation of a parallel job utilizing the GSM program generated at block 302. In order to create a job, the executable GSM program is supplied to job management program 206, with user-supplied execution attributes in a job command file. These execution attributes can include, for example, the number of nodes on which the job will execute. In response to receipt of the executable GSM program and the job command file, job management program 206 assigns a job ID that is unique across the entire data processing system and selects a set of nodes on which to execute the parallel job. Job management program 206 then invokes the runtime system for parallel jobs, such as Parallel Operating Environment (POE) 208. POE in turn spawns the GSM program executable on the set of nodes that job management program 206 allocated for the parallel job and sets up state that permits each task to determine its unique rank ordering within the parallel job. For instance, in a job with N tasks, exactly one task will have the rank order i, where 0<=i<N. The each tasks within the parallel job begins as a separate execution, with only the common job ID tying the tasks together. POE 208 also provides the mapping (e.g., in the form of a table) between the tasks and the physical systems on which the tasks are executing. Setup operations performed by job management program 206 also permit tasks to access interconnect resources on each node of a cluster.

Following block 304, the process of FIG. 3 proceeds to block 306, which illustrates establishing the Global Address Space (GAS). In order to establish the GAS, during initialization each task of a parallel job issues a system call to set up the global address space (GAS). This system call, referred to herein as gsm_init( ), reserves a portion of the effective address (EA) space on that task, to be used exclusively for performing global shared memory (GSM) allocations. By its parameters, the gsm_init( ) call specifies where to reserve effective address space for global address space operations, as well as the amount to be reserved. An OS can optionally limit how much of the address space can be used by a task. For example, AIX permits an application to use about 500 PBytes of the 16384 PBytes addressable in a 64-bit address space.

It should be noted that the gsm_init( ) call only reserves effective address space for use in subsequent allocations. Consequently, an access to the portion of the EA space reserved via gsm_init( ) system call but not explicitly allocated will fail because no physical backing storage will be allocated by the gsm_init( ) system call, either immediately or on demand, to back it (i.e., provide a physical storage location for the GAS). The gsm_init( ) system call thus behaves differently from the conventional UNIX brk( ) system call, which also allocates physical memory to the allocated EA space.

By having each task perform the gsm_init( ) system call before other memory allocations are made, it is possible (but not required) for all the tasks in a parallel job to map the global address space (GAS) at the same effective address (EA) space. In addition to reserving the GAS, the gsm_init( ) system call also accomplishes two additional tasks. First, the gsm_init( ) system call initializes HFI 120 in preparation for inter-node communication in the GSM model. Second, the gsm_init( ) system call creates send and receive FIFOs, which allow tasks to send active messages to one another. Active messaging is particularly important for programming models like X10 and also enables the construction of remote locking primitives.

Figure 4A:
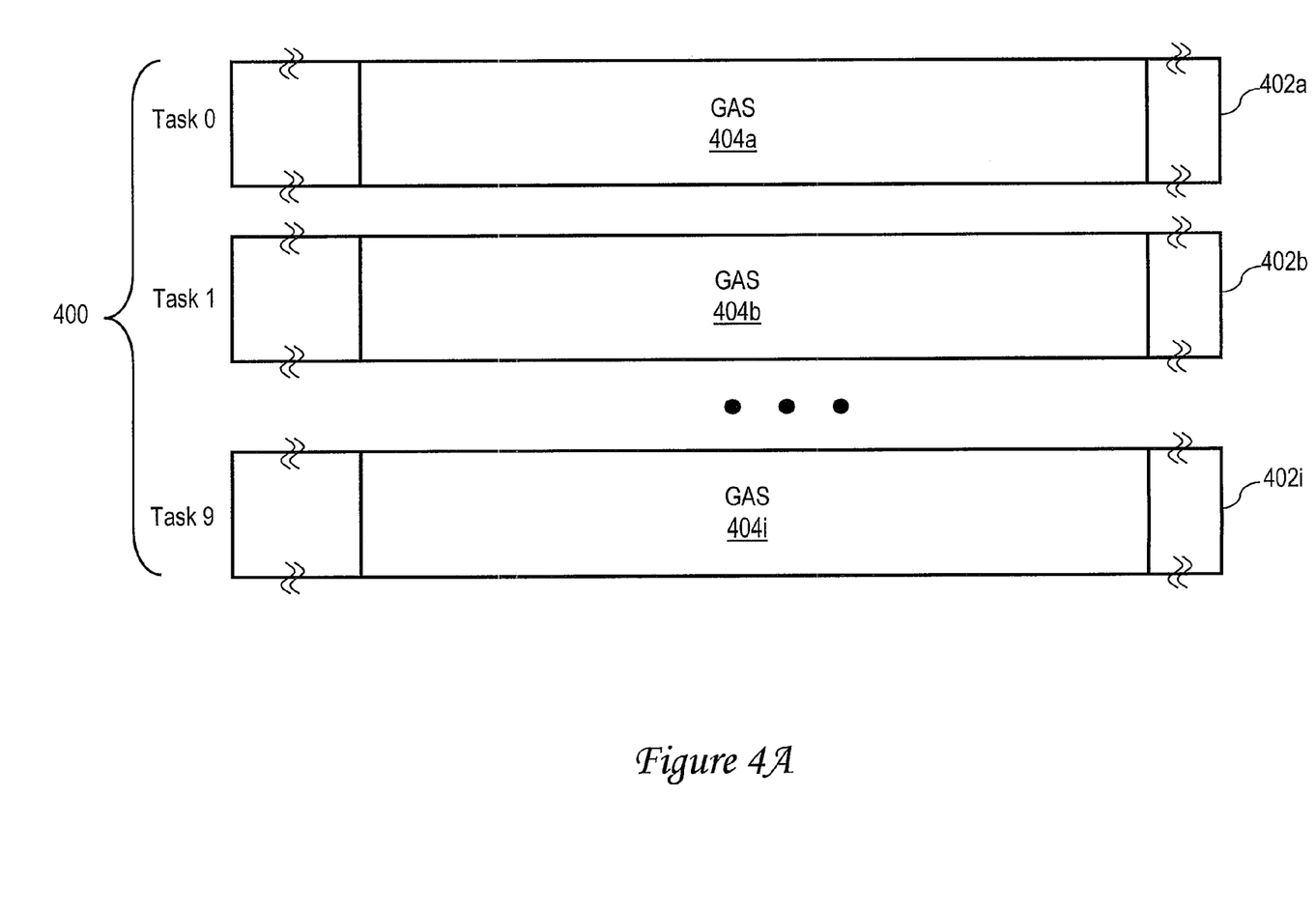
FIG. 4A depicts a representation of an exemplary effective address space of tasks comprising a parallel job following the reservation of the GAS.

Referring now to FIG. 4A, there is depicted a representation of an exemplary effective address space of tasks comprising a parallel job following the establishment of the GAS, as described with reference to block 306 of FIG. 3. In the exemplary embodiment, parallel job 400 comprising ten tasks, labeled Task 0 though Task 1. Each of the ten tasks is allocated a respective one of effective address (EA) spaces 402a-402i by its operating system 204. After each task issues its gsm_init( ) system call, a portion of the effective address (EA) space on that task is reserved for use exclusively for performing global shared memory (GSM) allocations, as illustrated at reference numerals 404a-404i.

Returning to FIG. 3, once the global address space has been initialized at block 306, individual tasks can independently allocate memory that can be globally addressed via effective addresses (EAs), as shown at block 308. Memory allocation on each task is achieved through a second system call referred to herein as gsm_alloc( ). The gsm_alloc( ) call specifies through its parameters the amount of backing storage to be allocated, as well as the effective address range within the global address space where the allocated backing storage must appear. All allocations are preferably performed locally with respect to the task issuing the gsm_alloc( ) system call. In at least some embodiments, the allocation can be performed either immediately or on demand, in accordance with a call parameter. All threads within the allocating task can access the allocated memory using load and store instructions.

In order to perform a memory allocation, the effective address range requested by the gsm_alloc( ) call must have been previously reserved through a gsm_init( ) system call. The task will need to coordinate its actions to ensure that it has not previously requested backing storage to be allocated to any part of the target effective address range. Provided there is enough backing storage in physical memory (or swap) and under these two conditions, the operating system 204 will be able to perform the requested allocation.

In preferred embodiments, the initialization (i.e., gsm_init( )) and allocation (i.e., gsm_alloc( )) system calls require no task inter-communication. Tasks in the parallel job are free to issue the system calls at any time during execution. However, in order to use the GSM, a group of tasks will communicate the results of the gsm_init( ) system call and coordinate the gsm_alloc( ) system call invocations with each other.

Since the gsm_init( ) call is a purely local operation, the effective address space it reserves may be placed at different offsets within each task's EA space. A group of tasks can ensure that the global address space appears at the same effective address on every task if each task issues the gsm_init( ) call at the same point of its execution (e.g., at the beginning).

Figure 4B:
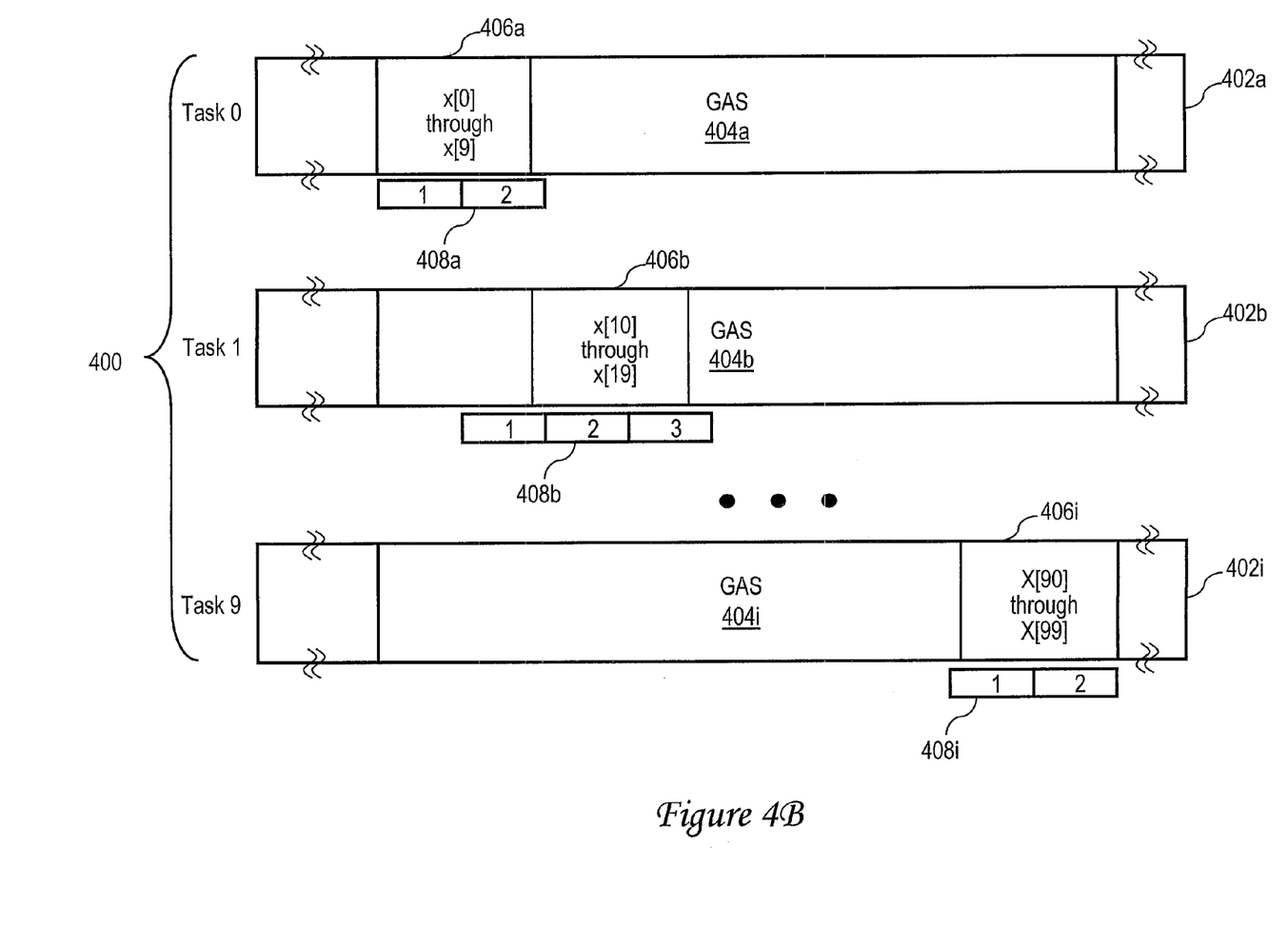
FIG. 4B illustrates a representation of an exemplary effective address space of tasks comprising a parallel job following the allocation of global shared memory (GSM) in the GAS.

With reference now to FIG. 4B, there is illustrated a representation of an exemplary effective address space of tasks comprising a parallel job following the allocation of memory in the GAS, as described with reference to block 308 of FIG. 3. In the depicted example, the allocation for a shared array X[ ] distributed across the GAS 404a-404i is shown. In particular, region 406a is allocated to X[0]-X[9] in GAS 404a of Task 0, region 406b is allocated to X[10]-X[19] in GAS 404b of Task 1, and so on until finally X[90]-X[99] is allocated in region 406i of GAS 404i. The portions of X[ ] allocated to the GAS 404 of a task are homed on the node executing that task. Physical memory 408a-408i is further allocated on each task's node to back the portion of X[ ] homed on that node.

Returning to FIG. 3, following the allocation of GSM as shown at block 308, the tasks comprising the parallel job operate on the GSM in order to perform their programmed work, as depicted at block 310. Utilizing the GSM memory model of the present invention, different tasks in a parallel job can perform operations efficiently on the global address space of the parallel job by issuing GSM operations, including reads (gets), writes (puts), atomic operations, and higher level operations constructed using these basic operations. All GSM operations refer to effective addresses within the constituent tasks of a GSM job. GSM operations are non-coherent, can be issued by an application from user-space code, and have a simple API so that they can be used by the compiler, library, or end-user.

In at least some preferred embodiments, load and store access to a location within the global address space that is homed on a remote node is not supported. More specifically, if a particular global address space location is homed on a first node, a task of the same parallel job executing on a different node cannot access the location using a load or store instruction. Instead, a GSM operation (such as a read (get), write (put), etc.) must be employed in order to access the location. In such embodiments, load and store instructions are instead utilized to access GSM locations that are homed on the node where a task is executing.

To illustrate GSM operations that may be employed, consider the following heavy-weight active messages that are operated on through user-supplied handlers. For example in order to GET L bytes from the EA of task T executing on node N uniquely identified by the tuple <T, EA> and store at the L bytes at effective address p, the following pseudo code commands can be performed:

```
command->node = N
command->ea = EA
command->size = L
command->window = window
command->operation = GET
command->store_where = p
```

Similarly, to PUT L bytes from effective address p to the EA of task T executing on node N uniquely identified by the tuple <T, EA>, the following pseudo code commands can be performed:

```
command->node = N
command->ea = EA
command->size = L
command->window = window
command->operation = PUT
command->load_from = p
```

While tasks (applications) utilize effective addresses to reference memory, all operations on physical memory are ultimately carried out using real or physical addresses. According to the present invention, all EAs within GSM operations are translated into real addresses (RAs) or physical addresses at the target of the GSM operation. Deferring address translation in this manner facilitates scalability to a large number of nodes. In a preferred embodiment, this destination address translation is performed by a memory management unit (MMU) in the HFI 120. HFI 120 also are preferably capable of performing a set of operations specified within incoming packets on the local processing node 102.

Following the GSM operations depicted at block 310, the process illustrated in FIG. 3 ends at block 312.

In many applications, the gsm_init( ) and gsm_alloc( ) system calls will be implemented as basic constructs that are unlikely to be used directly by a human programmer. Instead, GSM languages will provide higher-level constructs that use these system calls to build the global shared memory support that the GSM languages wish to offer. For example, a language with GSM support may offer a global_initialize( ) function to reserve the global address space for each task of the parallel job and communicate the address reservation to each task of the parallel job. Similarly, a global_malloc( )

function can be implemented as a programmer directive that allocates data structures with specific distributions by invoking gsm_alloc( ) on multiple individual tasks within a parallel job and then waits for all specified task allocations to complete before itself completing.

For example, the following pseudo-code illustrates one way a human programmer may write an application in order to invoke the gsm_int( ) and gsm_alloc( ) system calls. It should be noted that the below pseudo-code does not employ the constructs of any particular language, such as UPC or X10.

```
#define ONETERABYTE    (1024*1024*1024*1024)
int *x;
void *p;
main ( )
{
    p = global_initialize (ONETERABYTE);
    if (p == NULL)
        Error ("Could not allocate GSM\n");
    n = find_number_of_tasks( );
        x = global_malloc (p, n*10*sizeof(int), BLOCK);
        // operate on shared array x[ ]
}
```

The language and run-time library in this example choose to allocate shared array X[ ] such that it can be accessed with contiguous effective addresses (EAs) within the global address space. The run-time library may also choose to begin the global address space at the same effective address on each task. With this in mind, the actions taken by the compiler and run-time library for each of the program lines is as follows:
1. p=global_initialize (ONETERABYTE): This function call is executed by every task of the parallel job. Internally, the language run-time library will issue the gsm_init(ONETERABYTE) system call and record the return address. The run-time library could return a handle "p" to the task that the program can use in future interactions with the run-time library. After this function call completes, each task will have reserved 1 TByte of its effective address space (without allocation) for future GSM allocations.
2. if (p==NULL): This line of pseudo-code represents a check whether the initialization function call succeeded. The function call could fail if the OS could not reserve the amount of requested address space or because certain hardware structures in HFI 120 could not be allocated for the task.
3. n=find_number_of_tasks( ): This pseudo-code line represents a query of the run-time library to determine the number of tasks participating in the parallel job.
4. x=global_malloc (p, n*10*sizeof(int), BLOCK): This line of pseudo-code requests that the run-time library allocate memory to contain n*10 integers. In at least some exemplary embodiments, the global_malloc( ) call can be implemented as follows:
   a. Based on amount of data to globally allocate and the distribution (BLOCK, CYCLIC, etc.), compute how much backing storage should be requested on each task. The run-time library on each task can carry out this computation independently.
   b. Determine the effective address on each task where the portion of shared array X[ ] to be homed on that task should be placed. This step can also be done independently by the tasks.
   c. Invoke gsm_alloc( ) on each task. As parameters to the gsm_alloc( ) system call, supply the amount of backing storage to allocate and the specific effective address of the backing storage region. The system will allocate backing storage in integral numbers of memory pages that completely spans the requested allocation. The gsm_alloc( ) call will fail on any task where past run-time library requests have already allocated backing storage for any part of the specified region.
   d. Communicate to every task that the distributed actions of the GSM allocation have been completed. This will be a collective operation.
   e. Record the locations at which the different portions of shared array X[ ] are allocated on the tasks and use this information to map subsequent accesses to an array element of X [ ] to the tuple <task, EA> where the array element is homed.

Figure 4C:
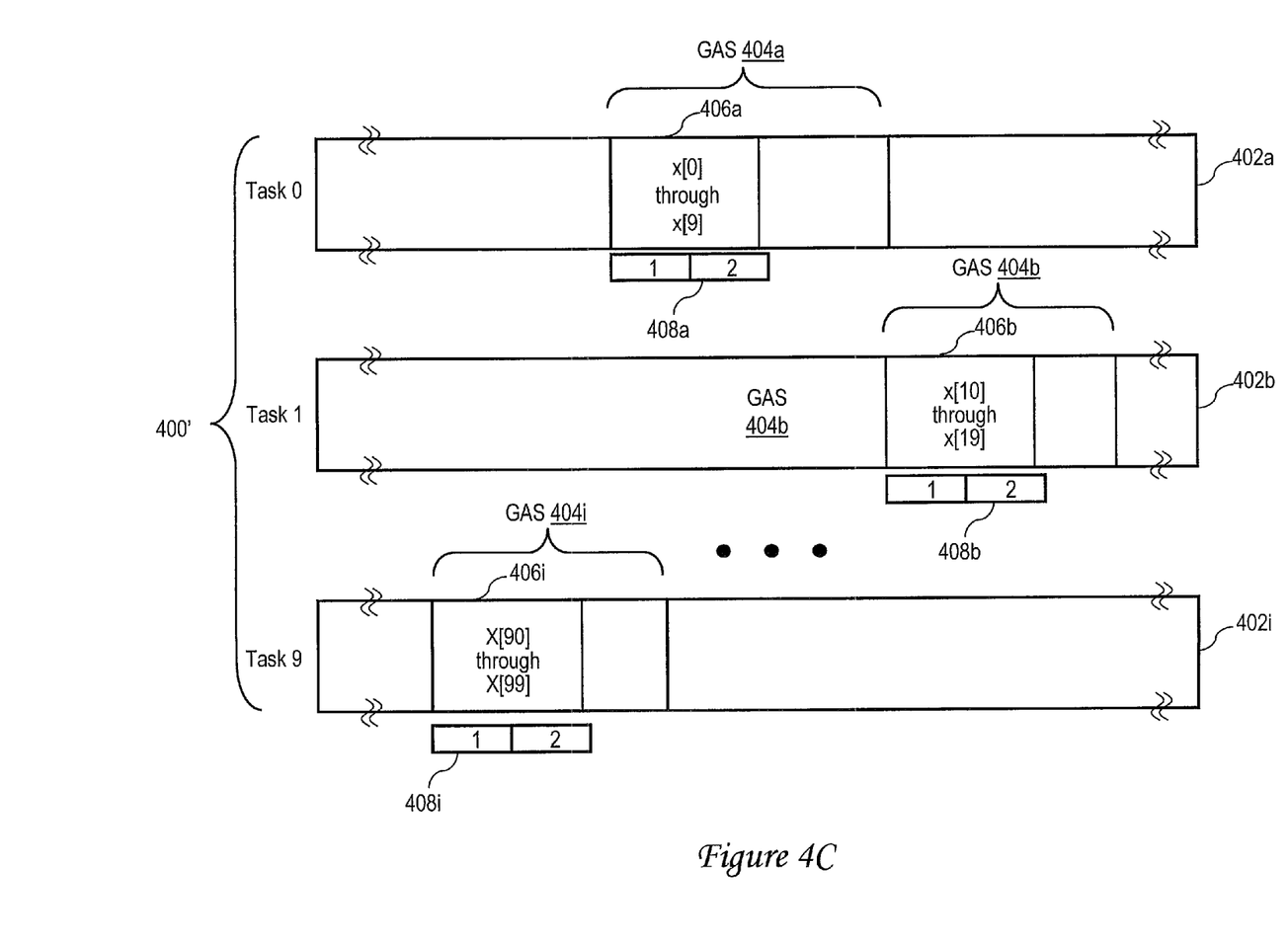
FIG. 4C depicts an alternative GSM allocation strategy for a parallel job.

It will be appreciated by those skilled in the art that the foregoing is but one of multiple possible strategies that the run-time library may choose to use. For the same program, the programming language and run-time library could allocate shared array X[ ] in a non-contiguous manner within the GAS. Furthermore, the GAS may also not begin at the same EA on each task, as shown in FIG. 4B. FIG. 4C shows this alternative GSM allocation strategy for parallel job 400'.

As indicated by FIGS. 4B-4C, applications preferably exercise complete control over the allocation of shared data structures within the GAS. Consequently, the compiler and run-time library have considerable flexibility in deciding where to place global data structures and how to map an access in the program to the effective address on the home node where the data is actually maintained. For the allocations shown in FIGS. 4B-4C, the run-time system allocates backing storage only for appropriate chunks of the global address space on each task. In the exemplary memory allocation shown in FIG. 4B, Tasks 0, 1, and 9 are collectively allocated seven physical memory pages, while in FIG. 4C Tasks 0, 1 and 9 are collectively allocated six physical memory pages. This discrepancy is memory allocation can be due, for example, to alignment differences (e.g., the allocations in FIG. 4C begin at page-aligned boundaries, while those depicted in FIG. 4B are not all page aligned).

Every access to a shared variable in a GSM application is translated into a tuple of the form <T, EA>, where EA is the effective address on task T where the location is homed. It will be appreciated that EA may be expressed as an absolute effective address on task T or, alternatively, can be expressed as an offset O from the base EA of the GAS for task T. Expression of the <T,EA> tuple utilizing an offset (e.g., <T,O>) allows tasks to reserve different portions of the address space for GSM operations without requiring remote tasks to store that starting information for other tasks. The GSM functionality provides applications with considerable flexibility in deciding how to map global data structures. As described with reference to FIGS. 4B-4C, the compiler and run-time library can trade off simplicity in determining where a shared element is homed against the fragmentation costs of the chosen mapping scheme.

Data structure placement is an important consideration since it can have a significant impact on the amount of physical memory required to support the allocation. For example, if the programmer specifies the shared array X[ ] should be distributed in a cyclic manner, an extensive amount of fragmentation and wasted physical memory will result if shared array X[ ] were to be allocated such that it can be contiguously addressed within the global address space.

Figure 4D:
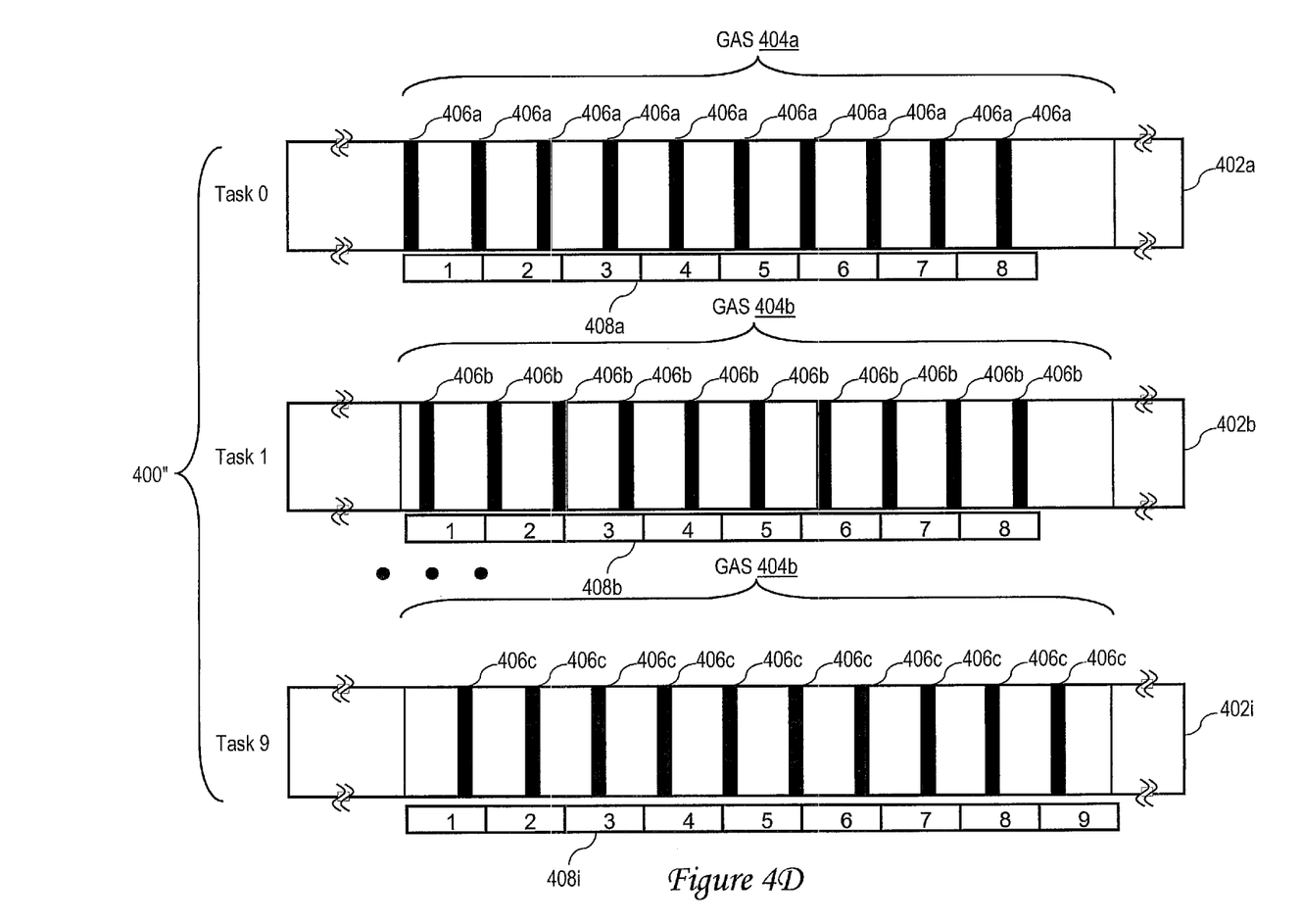
FIG. 4D illustrates yet another alternative GSM allocation strategy for a parallel job.

FIG. 4D shows this alternative cyclical GSM allocation strategy for parallel job 400". Because shared array X[ ] is cyclically distributed in this example and is maintained in contiguous addresses in the GAS, a large amount of physical memory is wasted. For example, in the exemplary allocation shown in FIG. 4D, tasks 0, 1, and 9 collectively consume 25 physical memory pages, rather than 6 physical memory pages as shown in the exemplary allocation shown in FIG. 4C.

As has been described, in at least some embodiments the present invention supports a global shared memory comprising an effective address space shared by multiple tasks within a parallel job. In at least some preferred embodiments, a portion of the global address space is first reserved as global shared memory by at least a first task among multiple tasks within a parallel job without allocation of backing storage. Thereafter, the at least one task allocates backing storage for the global shared memory from the reserved global address space. Following allocation, all tasks in the parallel job, including a second task executing on a remote node, can access the global shared memory utilizing effective addressing.

While the present invention has been particularly shown as described with reference to preferred embodiments, it will be understood by those skilled in the art that various changes in form and detail may be made therein without departing from the spirit and scope of the invention. For example, although aspects of the present invention have been described with respect to a data processing system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, data storage media (e.g., CD-ROM, hard disk drive, static memory), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of operating a data processing system, said method comprising:
   each of multiple tasks within a parallel job executing on multiple nodes of the data processing system issuing a system call to request allocation of backing storage in physical memory for global shared memory accessible to all of the multiple tasks within the parallel job, wherein said global shared memory is in a global address space defined by a range of effective addresses;
   each task among the multiple tasks receives an indication that the allocation requested by the system call was successful only if the global address space for that task was previously reserved and backing storage for the global shared memory has not already been allocated.

2. The method of claim 1, wherein the step of each of multiple tasks within the parallel job issuing a system call comprises executing a function call to a run-time library.

3. The method of claim 1, and further comprising:
   creating the parallel job; and
   spawning the multiple tasks on at least two nodes in the data processing system.

4. The method of claim 3, wherein creating the parallel job comprises:
   assigning a job identifier unique within the data processing system to the parallel job; and
   selecting a set of one or more nodes on which to execute the multiple tasks within the parallel job.

5. The method of claim 4, wherein spawning the multiple tasks includes a runtime environment spawning the multiple tasks on the selected nodes.

6. The method of claim 1, wherein the step of each of multiple tasks within a parallel job issuing a system call to request allocation of backing storage in physical memory for global shared memory comprises at least two of the multiple tasks requesting backing storage in physical memory for a same effective address.

7. A data processing system, comprising:
   an interconnect fabric; and
   a plurality of nodes coupled to the interconnect fabric, at least one of the plurality of nodes including data storage containing global system memory (GSM) program code executable within multiple of the plurality of nodes as a parallel job including multiple tasks, wherein when said GSM program code is executed, each of the multiple tasks issues a system call to request allocation of backing storage in physical memory for global shared memory accessible to all of the multiple tasks within the parallel job, wherein said global shared memory is in a global address space defined by a range of effective addresses;
   wherein each task among the multiple tasks receives an indication that the allocation requested by the system call was successful only if the global address space for that task was previously reserved and backing storage for the global shared memory has not already been allocated.

8. The data processing system of claim 7, wherein each of the multiple tasks within the parallel job issues the system call comprises by executing a function call to a run-time library.

9. The data processing system of claim 7, and further comprising:
   a job management program, executable on one of the plurality of nodes, that creates the parallel job; and
   a runtime environment, executable on one of the plurality of nodes, that spawns the multiple tasks on multiple of the plurality of nodes in the data processing system.

10. The data processing system of claim 9, wherein the job management program assigns a job identifier unique within the data processing system to the parallel job and selects the multiple nodes on which to execute the multiple tasks within the parallel job.

11. The data processing system of claim 7, wherein at least two of the multiple tasks request backing storage in physical memory for a same effective address.

12. A program product, comprising:
   a data storage medium readable by a data processing system having a plurality of nodes coupled by an interconnect fabric; and
   global system memory (GSM) program code within the data storage medium that is executable by the data processing system within multiple of the plurality of nodes as a parallel job including multiple tasks, wherein when said GSM program code is executed, each of the multiple tasks issues a system call to request allocation of backing storage in physical memory for global shared memory accessible to all of the multiple tasks within the parallel job, wherein said global shared memory is in a global address space defined by a range of effective addresses;
   wherein each task among the multiple tasks receives an indication that the allocation requested by the system call was successful only if the global address space for that task was previously reserved and backing storage for the global shared memory has not already been allocated.

13. The program product of claim 12, wherein each of the multiple tasks within the parallel job issues the system call comprises by executing a function call to a run-time library.

14. The program product of claim 12, and further comprising:
   a job management program, executable on one of the plurality of nodes, that creates the parallel job; and
   a runtime environment, executable on one of the plurality of nodes, that spawns the multiple tasks on multiple of the plurality of nodes in the data processing system.

15. The program product of claim 12, wherein the job management program assigns a job identifier unique within the data processing system to the parallel job and selects the multiple nodes on which to execute the multiple tasks within the parallel job.

16. The program product of claim 12, wherein at least two of the multiple tasks request backing storage in physical memory for a same effective address.

* * * * *